March 6, 1934.  F. H. OWENS  1,950,091
MARKING DEVICE FOR SOUND FILMS
Original Filed Oct. 5, 1929
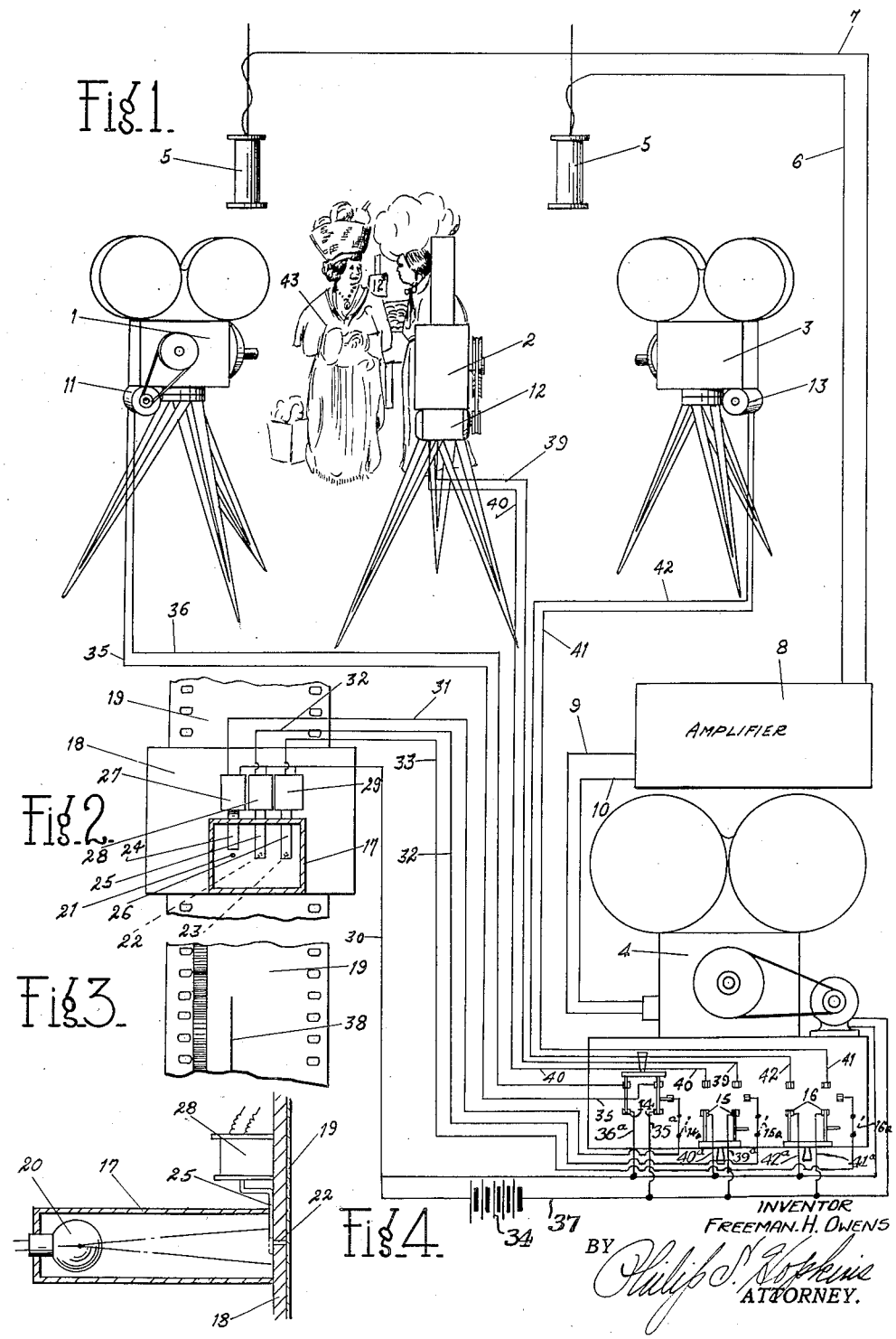

Patented Mar. 6, 1934

1,950,091

UNITED STATES PATENT OFFICE

1,950,091

MARKING DEVICE FOR SOUND FILMS

Freeman H. Owens, New York, N. Y., assignor to Owens Development Corporation, New York, N. Y., a corporation of New York Application October 5, 1929, Serial No. 397,500
Renewed August 2, 1933

15 Claims. (Cl. 88—16.2)

This invention relates to improvements in marking devices for sound films, the principal object of the invention being to provide, in combination with a sound recording camera and a plurality of picture cameras operated synchronously therewith, reliable means for indicating on the sound record the number and positions of the picture cameras that were used for photographing the accompanying scene at any given point in the sound record.

In making up a talking picture, each scene is usually photographed by a plurality of picture cameras disposed at different angles with relation to the scene, and simultaneously with the taking of the pictures an independent sound camera is operated to produce a master negative record of the sound appropriate to the scene. In the later operations on the film, such as editing the film and printing the sound record upon the final master picture negative, it is desirable to know not only how many picture cameras were in operation, but also the location of the cameras with relation to the scene at different times. The object therefore, of the present invention is to provide a dependable means for indicating with certainty the number of picture cameras, and their positions relative to the scene, that were in operation during the recording of any portion of the sound record.

Other objects and advantages of the invention will appear as the description proceeds.

In the accompanying drawing in this specification,

Figure 1 is a diagrammatic view of an apparatus embodying the features of the present invention;

Figure 2 is a partly diagrammatic and partly sectional view of a portion of the apparatus, illustrating in combination with Figure 1 the electrical circuits;

Figure 3 is a fragmentary view of a sound record film illustrating one of the picture camera indications placed thereon by means of the present invention; and Figure 4 is a detail sectional view of that portion of the apparatus shown in Figure 2, but taken at right angles to that figure.

Referring to the drawing 1, 2 and 3 designate motion picture cameras placed at different angles with relation to the scene to be photographed, and 4 designates a sound recording camera. Microphones 5 are suitably located to pick up the sound accompanying the scene and are connected by wires 6 and 7 with an amplifier 8 the output of which is connected by wires 9 and 10 with the recording means in the sound camera 4. The sound camera and the three picture cameras are preferably driven by synchronized motors in the usual way. In the present instance in the circuits of the individual motors 11, 12 and 13 for operating the picture cameras are included manually operable switches 14, 15 and 16 respectively.

A housing 17 is secured on a partition or wall 18 disposed within the sound camera 4 at a point past which the sound film 19 moves, and within which housing is mounted a lamp 20 in position to project light through three small perforations 21, 22 and 23 formed in the partition 18 and on to the film as it passes on the opposite side of the partition. Associated with each of said openings is a slidable closing member or shutter 24, 25 and 26 respectively adapted to be operated by solenoids 27, 28 and 29 into position to uncover their respective openings. The solenoids 27, 28 and 29 are connected by wires 30, 31, 32 and 33 in the circuits of the respective motors 11, 12 and 13 and the switches 14, 15 and 16. In other words, the solenoid 27 is in circuit with the motor 11 and switch 14, the solenoid 28 is in circuit with motor 12 and switch 15, and the solenoid 29 is in circuit with motor 13 and switch 16. It will be noted, however, from Figure 1 that there may be provided in the solenoid circuits between the switch members and the solenoids 27, 28 and 29, manually controlled switches 14a, 15a and 16a, whereby if desired, any given camera may be operated without actuating the solenoid to indicate the fact. This may be useful when no sound is being recorded, for instance.

The operation of the apparatus is as follows:—
If only one picture camera is to be used to take the picture, for instance the camera 1, as soon as the sound camera has been started the switch 14 is manually closed, whereupon the circuit will be closed between the battery or other source of current 34 and the motor 11, through wires 35, 36, 35a and 36a. Likewise the solenoid 27 will be energized by the current flowing through wires 30, 31, and 35a and including the switch 14a. Consequently the solenoid 27 will be energized simultaneously with the starting of the motor 11, thus causing the slide 24 to move into position to uncover its opening 21, so that light will pass through said opening from the lamp 20 on to the film whereby a line of light fog, as indicated at 38 in Figure 3, will be formed on the film. In like manner, if the picture camera 2 is to be used, the switch 15 will be closed, and the circuit closed between the source 34 and motor 12, through wires 39, 40, 39a and 40a. Likewise the solenoid 28 will be energized by the current through wires 30, 32, and 39a including the switch 15a, thereby causing the slide 25 to uncover its opening 22 and permit light to pass through to the film, thus forming a line of light fog in a different position in the width of the film from that formed through the opening 21. Finally, if the camera 3 is to be used, the switch 16 will be closed, and the circuit closed between the source 34 and motor 13, through wires 41, 42, 41a and 42a. Likewise the solenoid 29 will be energized through wires 30, 33 and 41a and including the switch 16a, thus causing slide 26 to uncover its opening 23 and permit light to pass through to the film and produce a line of light fog thereon in still another position in relation to the width of the film. It will, of course, be understood that any two, or all, of the picture cameras may be operated simultaneously.

It will be readily understood, of course, that although, for simplicity, I have shown the solenoid circuits in the same circuits with the motors and using the same source of power, I do not limit myself thereto, as obviously separate circuits could readily be provided.

It will be obvious from the foregoing, that by observing the position of the lines of light fog on the film it can readily be determined which picture camera or cameras was or were in operation at any particular point in the length of the film. The sound film thus carries a visible indication not only of the number of picture cameras that were used in photographing any given scene, but also indicates the particular cameras that were in operation. Therefore, with a knowledge of the angles at which the cameras were placed, the selection of that negative of the scene which is most appropriate to the recorded sound, is greatly enhanced. For instance, if the recorded sound indicates that the performer 43 was at a given time turned somewhat away from the microphone while speaking, that picture of the scene should be used which was produced by a camera that was at such an angle to the performer as to show him turned partly away.

I claim:—

1. The combination with a sound recording camera and a plurality of picture cameras adapted to be operated simultaneously with said sound recording camera, of means for indicating on a sound record film recorded in the sound recording camera the various picture cameras operated during the making of said record, comprising a marking device for said sound film for each of said picture cameras, and means for rendering said marking device operative upon the operation of their respective picture cameras.

2. The combination with a sound recording camera and a plurality of picture cameras adapted to be operated simultaneously with said sound recording camera, of electrically controlled means for indicating on a sound record film recorded in the sound recording camera the various picture cameras operated during the making of said record, comprising a fogging light for said sound film for each of said picture cameras, and means for rendering said lights operative upon the operation of their respective picture cameras.

3. The combination with a sound recording camera and a plurality of picture cameras adapted to be operated simultaneously with said sound recording camera, of electrical means for operating said picture cameras, means for indicating on a sound record film recorded in the sound recording camera the various picture cameras operated during the making of the record, and electrical means in circuit with the picture camera operating means for controlling the operation of said indicating means.

4. The combination with a sound recording camera and a plurality of picture cameras adapted to be operated simultaneously with said sound recording camera, of electrical means for operating said picture cameras, means for indicating on a sound record film recorded in the sound recording camera the various picture cameras operated during the making of the record, and electrical means in circuit with the picture camera operating means for controlling the operation of said indicating means, and independent manually operated means for opening or closing the circuit to said indicating means without affecting the camera operating means.

5. The combination with a sound recording camera and a plurality of picture cameras adapted to be operated simultaneously with said sound recording camera, of individual electrical means for operating said picture cameras, manually operable means for selectively actuating said operating means, means for indicating on a sound record film recorded in the sound recording camera the various picture cameras operated during the making of the record, and individual electrical means in circuit with the respective picture camera operating means for controlling the operation of said indicating means.

6. In combination, a sound recording camera, a plurality of picture cameras, individual motors for operating said picture cameras in synchronism with said sound recording camera, means for producing on a sound record traveling through said sound recording camera an indication of the various picture cameras being operated, and means in circuit with said motors and indicating means for selecting controlling their operation.

7. In combination, a sound recording camera, a plurality of picture cameras, individual motors for operating said picture cameras in synchronism with said sound recording camera, means carried by said sound recording camera for producing on a sound record film traveling therethrough visible marks corresponding in number and relative position with the picture cameras, electrical means for controlling the operation of said mark producing means, and individual means in circuit with the motors and their corresponding mark controlling means for selectively actuating the same.

8. In combination, a sound recording camera, a plurality of picture cameras, individual motors for operating said picture cameras in synchronism with said sound recording camera, means in said sound recording camera for forming on a sound record film traveling therethrough indicating images corresponding in number and relative position with the picture cameras, electrical means for controlling the operation of said image-forming means, and individual means in circuit with said motors and their corresponding image controlling means for selectively actuating the same.

9. In combination, a sound recording camera, a plurality of picture cameras, individual motors for operating said picture cameras in synchronism with said sound recording camera, a light source in said sound recording camera for forming on a sound record film traveling therethrough latent indicating images corresponding in number and relative position with the picture cameras, slidable members for controlling the passage of light from said source to said film, electrical means for actuating said slidable members, and individual switches in circuit with said motors and the corresponding electrical means for selectively actuating the same.

10. In combination, a sound recording camera, a plurality of picture cameras, individual motors for operating said picture cameras in synchronism with said sound recording camera, a light source in said sound recording camera for forming on a sound record film traveling therethrough latent indicating images corresponding in number and relative position with the picture cameras, slidable members for controlling the passage of light from said source to said film, a solenoid for actuating each of said slidable members, and individual switches in circuit with said motors and the corresponding solenoids for selectively actuating the same.

11. In combination, a sound recording camera, a plurality of picture cameras, individual motors for operating said picture cameras in synchronism with said sound recording camera, a partition disposed in said sound recording camera adjacent to the path of travel of a record carrying film, said partition being provided with perforations corresponding in number and position with said picture cameras, a source of light adapted to project light through said perforations and on to said film, individual slidable members normally covering said perforations, electrical means in circuit with said motors and adapted to actuate said slidable member into uncovering position, and means for selectively controlling the circuits through said motors and the corresponding slide-actuating means.

12. In combination, a sound recording camera, a plurality of picture cameras, individual motors for operating said picture cameras in synchronism with said sound recording camera, a partition disposed in said sound recording camera adjacent to the path of travel of a record carrying film, said partition being provided with perforations corresponding in number and position with said picture cameras, a source of light adapted to project light through said perforations and to said film, individual slidable members normally covering said perforations, individual solenoids in circuit with said motors and adapted to actuate said slidable member into uncovering position, and means for selectively controlling the circuits through said motors and the corresponding solenoids.

13. In combination a sound recording camera and a plurality of picture cameras adapted to be operated simultaneously with the recording camera, means for indicating on a sound record film recorded in said recording camera the various picture cameras operated during the making of said record, comprising a marking device for the sound film for each of the picture cameras, means for selectively operating said picture cameras and means actuated by said operating means for simultaneously operating the corresponding marking means.

14. In combination, a sound recording camera and a plurality of picture cameras adapted to be operated simultaneously with the recording camera, means for indicating on a sound record film recorded in said recording camera the various picture cameras operated during the making of said record, comprising a marking device for the sound film for each of the picture cameras, means for selectively operating said picture cameras, means actuated by said operating means for simultaneously operating the corresponding marking means, and means for rendering said marking means inoperative independent of said picture camera.

15. In combination, a sound recording camera and a plurality of picture cameras adapted to be operated simultaneously with the recording camera, means for indicating on a sound record film recorded in said recording camera the various picture cameras operated during the making of said record, comprising a marking device for the sound film for each of the picture cameras, means for selectively operating said picture cameras, means actuated by said operating means for simultaneously operating the corresponding marking means, and means for rendering said marking means inoperative independent of said picture camera, said marking means comprising fogging lamps for said sound film.

FREEMAN H. OWENS.

CERTIFICATE OF CORRECTION.

Patent No. 1,950,091.                                                                 March 6, 1934.

FREEMAN H. OWENS.

It is hereby certified that error appears in the printed specification of the above numbered patent requiring correction as follows: Page 2, line 115, claim 6, for "selecting" read selectively; and that the said Letters Patent should be read with this correction therein that the same may conform to the record of the case in the Patent Office.

Signed and sealed this 3rd day of April, A. D. 1934.

F. M. Hopkins (Seal)                                                                 Acting Commissioner of Patents.